United States Patent
Shinji et al.

(10) Patent No.: US 6,793,382 B2
(45) Date of Patent: Sep. 21, 2004

(54) VEHICLE LAMP

(75) Inventors: Katsuhisa Shinji, Shizuoka (JP); Shigehiko Kazaoka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/286,514

(22) Filed: Nov. 1, 2002

(65) Prior Publication Data

US 2003/0081423 A1 May 1, 2003

(30) Foreign Application Priority Data

Nov. 1, 2001 (JP) ........................................ 2001-336477

(51) Int. Cl.⁷ ............................................. F21V 21/08
(52) U.S. Cl. ........................ 362/399; 362/555; 362/545; 362/800
(58) Field of Search ................................. 362/481, 474, 362/484, 496, 501, 511, 543, 544, 545, 146, 152, 244, 800, 555; 313/512

(56) References Cited

U.S. PATENT DOCUMENTS

| 4,557,494 A | 12/1985 | Elwell |
| 5,779,228 A | * 7/1998 | Hansen ..................... 256/65.05 |
| 5,915,830 A | 6/1999 | Dickson et al. |
| 6,065,852 A | * 5/2000 | Crumley ..................... 362/146 |
| 6,135,621 A | * 10/2000 | Bach et al. ................. 362/399 |
| 6,179,454 B1 | 1/2001 | Hoines |
| 6,190,027 B1 | 2/2001 | Lekson |
| 6,250,785 B1 | 6/2001 | Mallia et al. |
| 6,553,629 B2 | * 4/2003 | Grady et al. .................. 16/444 |
| 6,592,240 B2 | * 7/2003 | Camarota et al. ........... 362/399 |

* cited by examiner

*Primary Examiner*—Thomas M. Sember
*Assistant Examiner*—Hargobind S. Sawhney
(74) *Attorney, Agent, or Firm*—Koda & Androlia

(57) ABSTRACT

A vehicle lamp including a light source disposed at each end of a bar-shaped light conductor obtained by forming a transparent base material into a bar shape so that the bar-shaped light conductor emits light that is from the light sources and enters the bar-shaped light conductor. A light-emitting diode is disposed as the light source in a closed container-like casing that has a transparent translucent portion at least in a portion of the casing where the light-emitting diode is positioned to face the translucent portion, and an end surface of the bar-shaped light conductor is positioned so as to face the light-emitting diode with the translucent portion in between.

12 Claims, 4 Drawing Sheets

VEHICLE LAMP

BACKGROUND OF THE INVENTION

1. Field of the Invention

The present invention relates to a vehicle lamp and more particularly to a vehicle lamp mounted preferably on the exterior of a vehicle.

2. Prior Art

Some vehicle lamps are installed on the exterior of a vehicle body. For example, a vehicle, which has a great height and accordingly requires a foot step for passengers to get in and out of the vehicle, such as an off-road vehicle or the like, uses a lamp for illuminating the tread surface of the foot step so that the tread surface is well visible in the dark.

A lamp on the exterior of a vehicle body as described above needs reliable waterproof characteristics; and for the lamp illuminating the foot step as described above, the lamp needs substantially uniformly illuminate the foot step over the entire length thereof.

SUMMARY OF THE INVENTION

Accordingly, it is an object of the present invention to provide a lamp that has excellent waterproofness and is capable of substantially uniformly illuminating over a certain area, thus satisfying the structural demands as described above.

The above object is accomplished by a unique structure for a vehicle lamp in which a light source is disposed at each end of a bar-shaped light conductor obtained by forming a transparent base material into a bar shape, and the bar-shaped light conductor emits light that is from the light source and enters the bar-shaped light conductor, wherein a light-emitting diode is disposed as the light source in a closed container-like casing that has a transparent translucent portion at least in a portion of the casing so that the light-emitting diode is positioned so as to face the transparent translucent portion, and an end surface of the bar-shaped light conductor is positioned so as to face the light-emitting diode with the translucent portion in between.

In the above structure, the light-emitting diode, which is the light source, is disposed inside the closed container-like casing and faces the end surface of the bar-shaped light conductor with the translucent portion that is part of the casing in between. Accordingly, the vehicle lamp has reliable waterproofness at a portion where the light source is disposed.

Furthermore, since the bar-shaped light conductor emits light for the entire length thereof, substantially uniform illumination over a certain length and area is accomplished.

DETAILED DESCRIPTION OF THE INVENTION

Embodiments of the vehicle lamp according to the present invention will be described below with reference to the accompanying drawings. In the following, the description will be made on a lamp that illuminates the foot step of a motor vehicle.

The vehicle lamp 1 is substantially comprised of a bar-shaped light conductor 2 and light source units 3 disposed at both ends of the bar-shaped light conductor 2.

The bar-shaped light conductor 2 is formed from a transparent material that includes, for example, a transparent synthetic resin such as acrylic resin or the like, and it has a cylindrical shape. As best seen from FIG. 4, a band-form light reflector layer 4 is provided on the upper portion of the outer circumference of the bar-shaped light conductor 2 so that the light reflector layer 4 extends in the axial direction of the bar-shaped light conductor 2. The light reflector layer 4 is formed by printing, vapor deposition, multi-color extrusion forming, etc.

Figure 4:
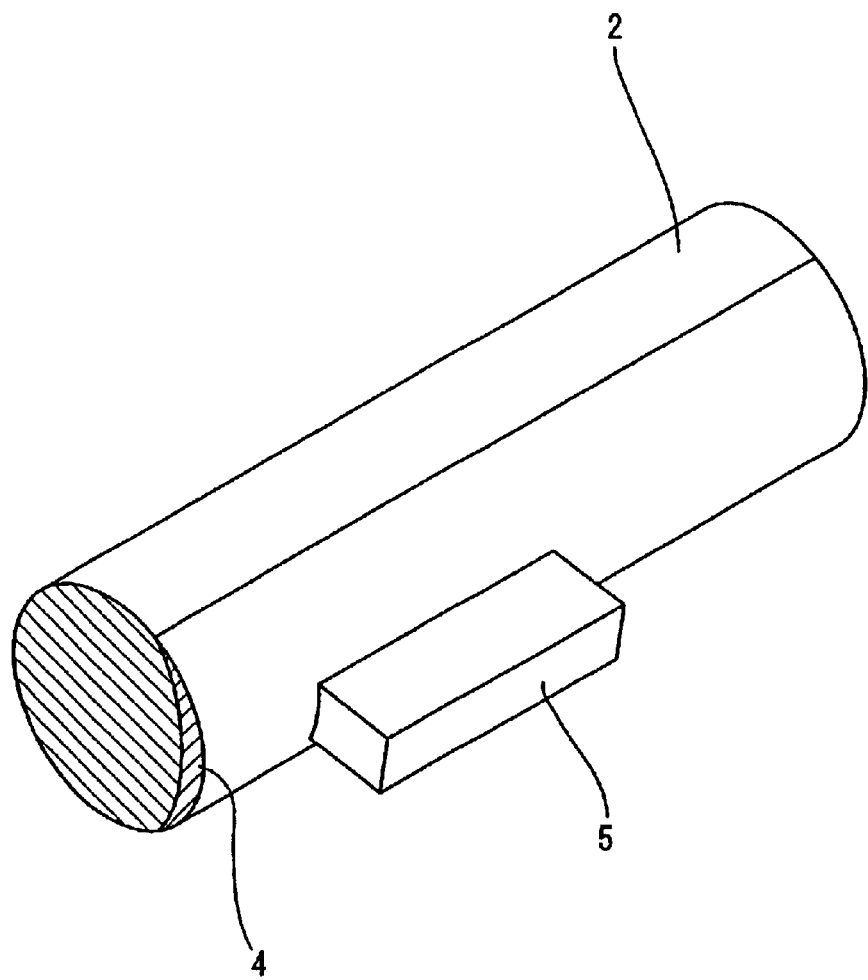
FIG. 4 is a perspective view of one end of the bar-shaped light conductor used in the lamp.

Near both ends of the bar-shaped light conductor 2, positioning ridges 5 are formed (FIG. 4 shows only one end of the conductor 2 and thus shows only one positioning ridge 5). The positioning ridges 5 are formed on the outer surface of the bar-shaped light conductor 2 and extend in the direction of the length of the bar-shaped light conductor 2.

Each light source unit 3 is comprised of a closed container-like casing 6, an LED (light emitting diode) circuit board 8 which is disposed in the casing 6 and carries thereon a light-emitting diode 7, and a cover 9 which is fitted on the inner side surface of the casing 6.

The casing 6 is comprised of two halves, an inner half 10 and an outer half 11, that are joined into a single body.

Figure 1:
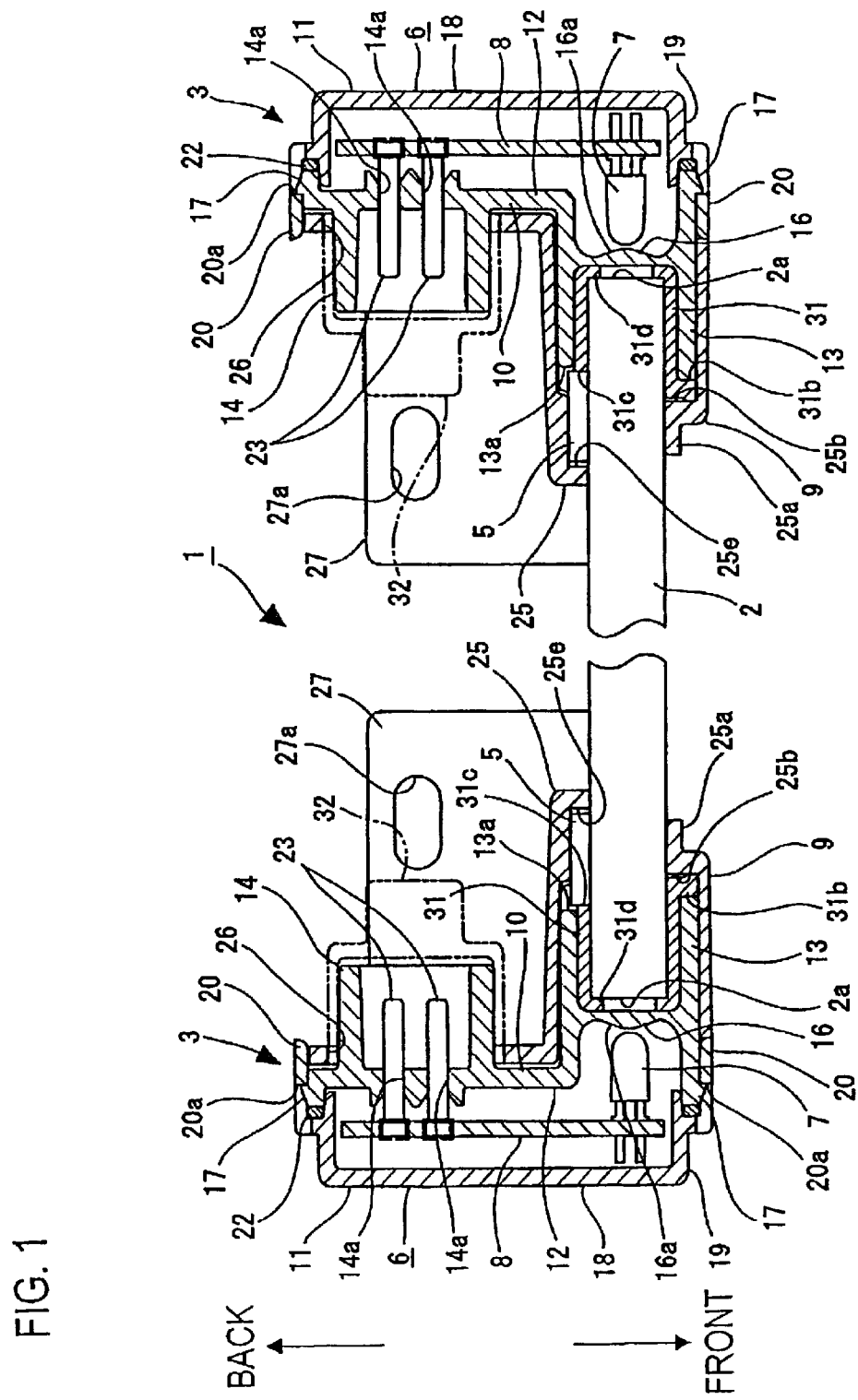
FIG. 1 illustrates in horizontal section one embodiment of the vehicle lamp according to the present invention with the lamp partially omitted.
Figure 2:
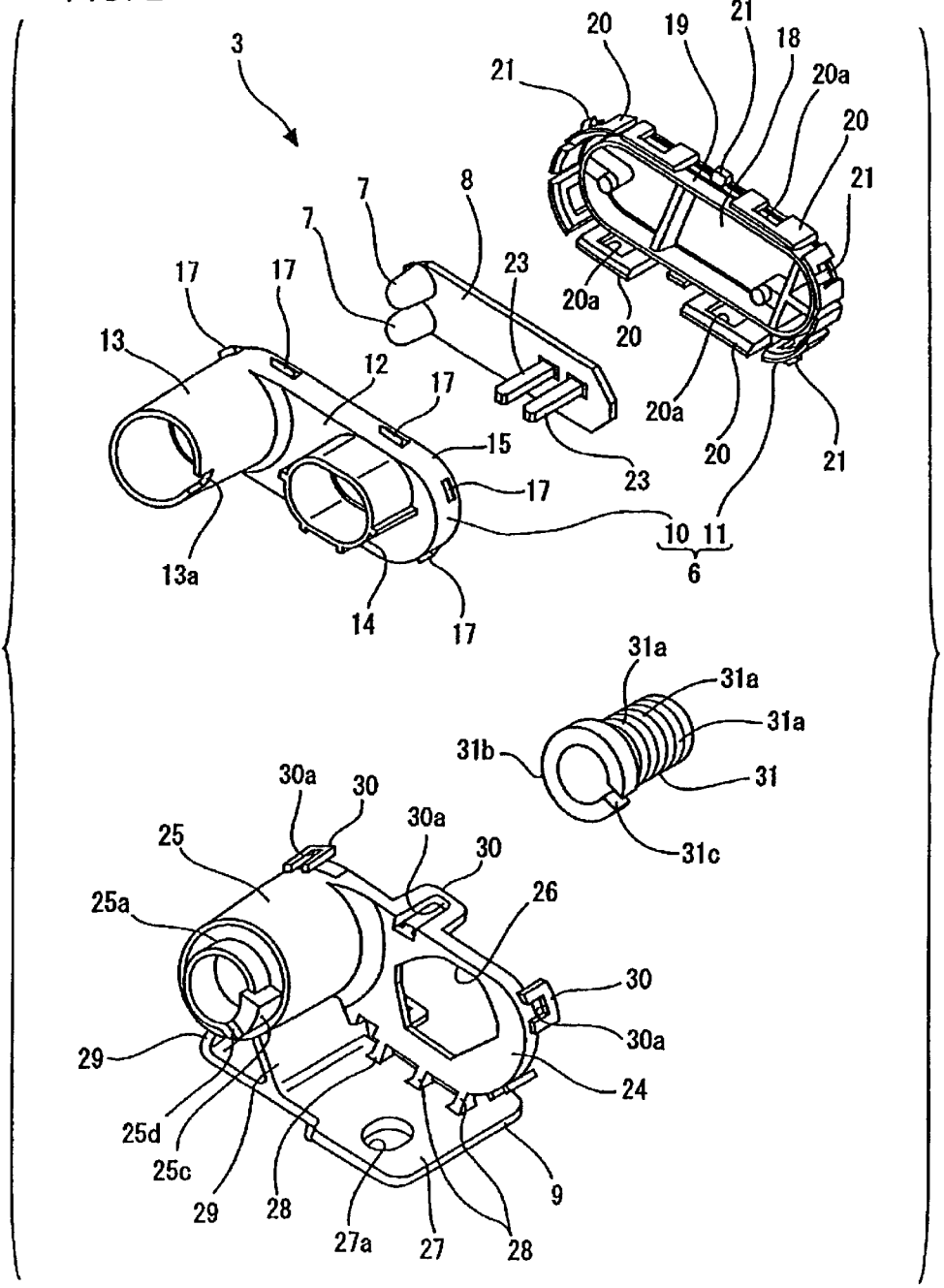
FIG. 2 is an exploded perspective view of the cover and the casing of the lamp.
Figure 3:
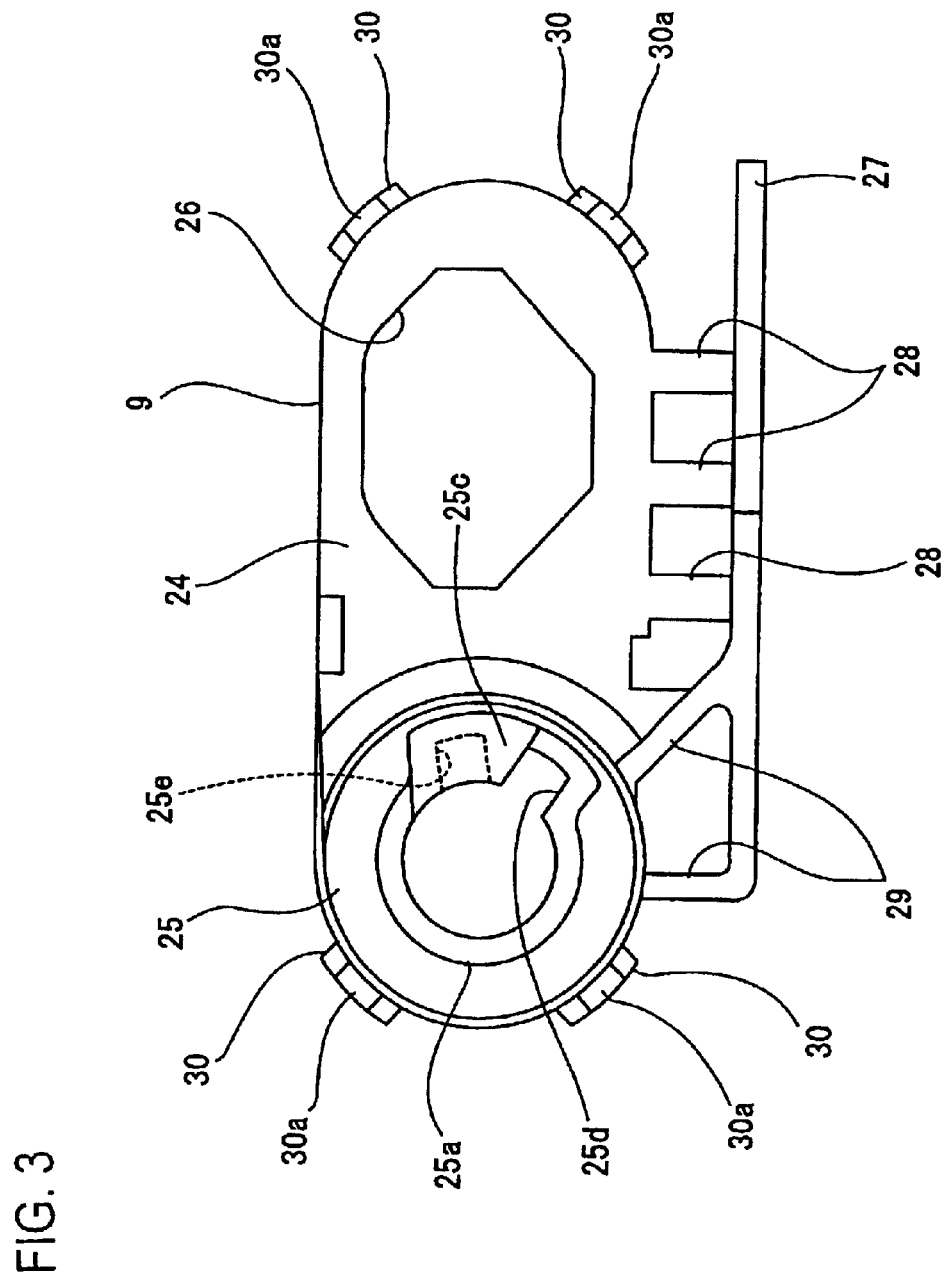
FIG. 3 is a side view of the cover.

In the following description, the "inner side" is the side that faces the bar-shaped light conductor 2, and the "outer side" is the side that is opposite from the bar-shaped light conductor 2. Thus, the inner half 10 of each one of the light source units 3 is positioned in FIG. 1 on the inner side and the outer half 11 is positioned on the outer side.

The inner half 10 is formed from a transparent material that includes, for example, a transparent synthetic resin such as polycarbonate or the like.

The inner half 10 includes a tubular coupling portion 13 and a tubular connector case portion 14 both formed on a generally platy main surface portion 12. The tubular coupling portion 13 and the tubular connector case portion 14 protrude inwardly (or protruding toward the right in FIG. 1 for the left side light source casing 3) from the main surface portion 12 of the inner half 10, and they are apart from each other in the front-back direction (the longitudinal direction of the drawing sheet of FIG. 1). A peripheral wall 15 protrudes outward from the peripheral edge of the main surface portion 12.

The coupling portion 13 has a generally cylindrical shape and is formed with an engaging notched portion 13a at the end.

The connector case portion 14 has a noncircular tubular shape. A part of the main surface portion 12 that is located in the bottom of the connector case portion 14 is, as best seen from FIG. 1, formed with insertion holes 14a.

A partition wall 16 that separates the inner and outer spaces of the inner half 10 is formed in the bottom of the coupling portion 13. The partition wall 16 is in the translucent portion of the lamp, and the surface 16a of the translucent portion 16 protrudes inwardly in a spherical surface fashion, thus having a lens function.

A plurality of engaging protrusions 17 are formed on the outer peripheral surface of the peripheral wall 15.

The outer half 11 is formed from an opaque material that includes, for example, an opaque synthetic resin such as polypropylene or the like. The outer half 11 includes a peripheral wall 19 that protrudes inwardly from the peripheral edge of a generally platy main surface portion 18.

A plurality of coupling pieces 20 are formed so as to protrude inwardly from the outer peripheral surface of the peripheral wall 19. Each of the coupling pieces 20 has an engaging opening 20a. In addition, engaging protrusions 21 are formed at appropriate locations on the outer peripheral surface of the peripheral wall 19.

The above-described two halves 10 and 11 are joined together at their open faces with a packing 22 in between. In other words, the engaging protrusions 17 of the inner half 10 are engaged with the engaging openings 20a of the coupling pieces 20 of the outer half 11; and thus, the two halves 10 and 11 are joined together and form each one of the right and left light source units 3 with the LED circuit board 8 inside.

The light-emitting diodes 7 and connector pins 23 are provided on the LED circuit board 8, and printed conductors and circuit elements (both not shown) for connecting the light-emitting diodes 7 and the connector pins 23 are formed on the LED circuit board 8.

When the LED circuit board 8 is installed in the casing 6, the light-emitting diodes 7 face the convex spherical surface 16a of the translucent portion 16, and the connector pins 23 extend through the insertion holes 14a of the connector case portion 14 so that the connector pins 23 are mostly positioned inside the connector case portion 14.

The cover 9 is disposed so as to cover the coupling portion 13 of the inner half 10 of each one of the casings 6. The cover 9 is formed from an opaque material that includes, for example, an opaque synthetic resin such as polypropylene or the like. The cover 9 has a platy main section 24 which is elongate in the front-back direction and whose plane is in the perpendicular direction. A generally cylindrical tubular cover section 25 protrudes inwardly from the front end of the main section 24, and a connector insertion aperture 26 is formed in the rear portion of the main section 24.

A distal end 25a of the tubular cover section 25 has a smaller radius than the other portion of the tubular cover section 25. The inner surface of the tubular cover section 25 thus has a stepped portion 25b that faces the base end side of the tubular cover section 25 (or faces the main section 24).

An engagement portion 25c is formed at the distal end 25a of the tubular cover section 25 and has a larger radius than the rest of the distal end 25. The engagement portion 25c is formed with, in its inner peripheral surface portion, two notch portions 25d and 25e that extend in the axial direction of the tubular cover section 25. The notch portion 25d has an open distal end and serves as an insertion notch. The other notch portion 25e has a closed distal end and serves an engaging notch.

In the lower portion of the cover 9, a platy base section 27 is formed. The outer edge portion of the base section 27 and the lower end edge of the main section 24 are connected by a plurality of ribs 28. The base section 27 and the lower portion of the tubular cover section 25 are connected by connection plates 29. The base section 27 is formed with a mounting hole 27a.

The main section 24 of the cover 9 is formed on its peripheral edge with outwardly protruded coupling pieces 30. Each of the coupling pieces 30 has an engaging opening 30a.

The tubular cover section 25 of the cover 9 is brought to fit on the coupling portion 13 of the casing 6 with the connector case portion 14 of the casing 6 being inserted the connector insertion aperture 26 of the cover 9. The engaging openings 30a of the coupling pieces 30 of the cover 9 are engaged with the engaging protrusions 21 of the casing 6. The cover 9 is thus attached to the casing 6.

Before the cover 9 is attached to the casing 6, each end of the bar-shaped light conductor 2 is engaged with the cover 9. More specifically, one end of the bar-shaped light conductor 2 is inserted into the tubular cover section 25 of the cover 9 of one of the light source units 3, and another end of the bar-shaped light conductor 2 is inserted into the tubular cover section 25 of the cover 9 of the other of the light source units 3. In this case, the positioning ridge 5 of the bar-shaped light conductor 2 is brought into the insertion notch 25d of the tubular cover section 25. Then, the bar-shaped light conductor 2 is slightly rotated so that a position alignment in which the positioning ridge 5 faces the engaging notch 25e of the tubular cover section 25 is made. Keeping this state, the bar-shaped light conductor 2 is moved in a pull-out direction (or to the right for the left end of the bar-shaped light conductor 2 in FIG. 1) relative to the tubular cover section 25; as a result, the positioning ridge 5 is engaged with the engaging notch 25e, the positioning of the bar-shaped light conductor 2 in its circumferential direction (around the axis) is accomplished, and the light reflector layer 4 of the bar-shaped light conductor 2 is positioned substantially on the back side.

Then, a tubular bushing 31 formed from an elastic material that includes, for example, a synthetic rubber, is fitted into the coupling portion 13 of the casing 6.

The inside diameter of the bushing 31 is slightly smaller than the outside diameter of the bar-shaped light conductor 2, and the outside diameter of the bushing 31 is substantially equal to the inside diameter of the coupling portion 13. The outer peripheral surface of the bushing 31 is formed with ruffle ridges 31a that extend in a circumferential direction. The outside diameter of the ruffle ridges 31a is slightly larger than the inside diameter of the coupling portion 13.

One end of the bushing 31 is formed with a flange 31b that protrude outwardly, and a notch 31c is formed in the flange 31b. Another end or a base end of the bushing 31 is formed with an inner flange 31d that protrudes inwardly (see FIG. 1).

The bushing 31 is fitted into the coupling portion 13 of the casing 6 so that the flange 31b of the bushing 31 covers the distal end of the coupling portion 13 and the notch 31c of the bushing 31 is aligned with the engaging notch 13a of the coupling portion 13.

When the bushing 31 is thus fitted in the coupling portion 13, the ruffle ridges 31a of the bushing 31 are compressed against the inner peripheral surface of the coupling portion 13 and deformed. As a result, a watertight engagement is obtained between the bushing 31 and the coupling portion 13.

Then, the cover 9 to which the bar-shaped light conductor 2 is connected at its end as described above is connected to the casing 6 to which the bushing 31 is fitted as described above.

Accordingly, the end of the bar-shaped light conductor 2 is fitted in the coupling portion 13 of the casing 6 via the bushing 31, and the peripheral edge of the end surface 2a of the bar-shaped light conductor 2 is in contact with the inner flange 31d of the bushing 31; and also the end surface 2a of the bar-shaped light conductor 2 faces the light-emitting diodes 7 with the translucent portion 16 of the casing 6 in between.

The edge portion of the positioning ridge 5 on the bar-shaped light conductor 2 is engaged with the engaging notch 13a of the coupling portion 13 and with the notch 31c of the bushing 31 of the casing 6.

Since the positioning ridge 5 of the bar-shaped light conductor 2 is engaged with the engaging notch 25e of the cover 9, the bar-shaped light conductor 2 is prevented from being separated from the cover 9.

Two light source units 3 are respectively attached to both ends of the bar-shaped light conductor 2 as described above, thus forming the vehicle lamp 1.

The thus structured vehicle lamp 1 is mounted on a vehicle body (not shown) via the base sections 27 of the covers 9. The circuits on the LED circuit boards 8 of the light source units 3 are connected to a power supply unit (not shown) via the power supply-side connectors 32 positioned inside the connector case portions 14.

Though not shown, each of the power supply-side connectors 32 is provided with a waterproof cover, so that a waterproof sealing between the power supply-side connectors 32 and the connector case portions 14 is obtained.

When mounted on a vehicle body, a portion of each casing 6 that includes the coupling portion 13 is positioned outside the vehicle body.

When the light-emitting diodes 7 are turned on, the light, which is from the light-emitting diodes 7 and has a predetermined directivity when passing through the translucent portion 16 of each casing 6 due to the lens effect of the translucent portion 16, enters the bar-shaped light conductor 2 through both end surfaces 2a of the bar-shaped light conductor 2.

After having entered the bar-shaped light conductor 2, light spreads out for the entire bar-shaped light conductor 2 while repeating internal reflections. Of such light in the bar-shaped light conductor 2, the light incident on the light reflector layer 4 is reflected by the light reflector layer 4 and travels substantially to the front of the bar-shaped light conductor 2, thus illuminating the area around the bar-shaped light conductor 2.

In the above vehicle lamp 1, the light-emitting diodes 7, which are the light source, are disposed inside each closed container-like casing 6 and face the corresponding one of the end surfaces 2a of the bar-shaped light conductor 2 via the translucent portion 16 that is part of the casing 6. Accordingly, waterproofness is assured on portions where the light sources are disposed, and as a result, the vehicle lamp 1 can be installed on the outside of a vehicle body.

Since the bar-shaped light conductor 2 emits light for its entire length, a substantially uniform illumination over a certain length is assured. Thus, the vehicle lamp 1 is suitable as a lamp that illuminates an object that has a certain length, such as a tread surface of a foot step of a motor vehicle or the like.

Furthermore, the inner half 10 that is part of each casing 6 is formed from a transparent material, and a portion of the inner half 10 is translucent (at the translucent portion 16). Accordingly, there is no need to additionally provide a component that makes the translucent portion 16 watertight. Thus, the number of components required is small, and a low-cost vehicle lamp obtainable.

Yet further, the translucent portion 16 has a lens effect. Accordingly, the light that is incident on the bar-shaped light conductor 2 from the light-emitting diodes 7 has a desired directivity and reaches the central portion of the bar-shaped light conductor 2. Thus, the luminous intensity drop in the central portion of the light conductor 2 that is far from the light sources is small, and a substantially uniform illumination for the entire length of the bar-shaped light conductor 2 is accomplished.

Of the inner half 10 of each casing 6 that is formed from a transparent material, a portion that is positioned outside the vehicle body, that is, a portion in front of the coupling portion 13, is covered by the cover 9. Accordingly, light leakage from the inner halves 10 is prevented. Also, since the covers 9 connect both ends of the bar-shaped light conductor 2 to the coupling portions 13 of the casings 6, no special member is needed for preventing light leakage.

Still further, both ends of the bar-shaped light conductor 2 are fitted in and connected to the connector portions 13 of the casings 6. Accordingly, the end surfaces 2a of the bar-shaped light conductor 2 are precisely positioned so as to face the light-emitting diodes 7 which are the light sources. Furthermore, the bushings 31 are provided between the connector portions 13 and the end portions of the bar-shaped light conductor 2, thereby assuring watertproofness. Accordingly, the (incidence) end surfaces 2a of the bar-shaped light conductor 2 and the surfaces of the translucent portions 16 of the casings 6 that face the bar-shaped light conductor 2 are prevented from being soiled from rainwater, dirt, etc.

The configurations and structures of various portions described above in conjunction with the embodiments are mere illustrations of the present invention. It should be understood that above description does not restrict the technical scope of the present invention.

As is apparent from the foregoing description, in the vehicle lamp of the present invention, a light source is disposed at each end of a bar-shaped light conductor that is obtained by forming a transparent base material into a bar shape, and the light from the light source enters the bar-shaped light conductor which causes the bar-shaped light conductor to emit light; and in addition, a light-emitting diode, which is the light source for the lamp, is disposed in a closed container-like casing that has a translucent portion, so that the light-emitting diode faces the translucent portion, and each end surface of the bar-shaped light conductor is set to face the light-emitting diode with the translucent portion in between.

Since the light-emitting diode, which is the light source, is disposed inside the closed container-like casing and faces the end surface of the bar-shaped light conductor with the translucent portion that is a portion of the casing body in between, reliable waterproofness is assured at a portion where the light source is provided.

Furthermore, since the bar-shaped light conductor emits light for its entire length, a substantially uniform illumination is accomplished over a certain length.

In addition, the casing is formed by joining two halves with at least each of which formed from a transparent material and having a translucent portion that has a lens function. Accordingly, without using additional lenses, the light incident on the bar-shaped light conductor from the light-emitting diode has a desired directivity, and the light from the light source can reach the axially central portion of the bar-shaped light conductor. Thus, luminous intensity drop in the central portion that is far from the light source is prevented, and a substantially uniform illumination for the entire length of the bar-shaped light conductor is accomplished.

In the present invention, a portion of the transparent half other than the translucent portion is covered with a cover that is formed from a non-transparent material. Accordingly, unnecessary light leakage from the transparent half is prevented.

Furthermore, in the present invention, each casing has a tubular coupling portion that protrudes from a location that surrounds the translucent portion, the end of the bar-shaped light conductor is fitted in the coupling portion, and a tubular bushing is disposed between the outer peripheral surface of the end of the bar-shaped light conductor and the inner peripheral surface of the coupling portion. Accordingly, the end surfaces of the bar-shaped light conductor are precisely positioned and face the light-emitting diodes. Furthermore, waterproofness between the coupling portion and the end of the bar-shaped light conductor is assured. Accordingly, the (incidence) end surfaces of the bar-shaped light conductor and the surfaces of the translucent portions of the casings that face the bar-shaped light conductor are prevented from being soiled from rainwater, dirt, etc.

In addition, the vehicle lamp is installed so as to illuminate, for instance, a tread surface of a foot step that is stepped on by passengers getting in and out of a vehicle. Accordingly, a substantially uniform illumination over the entire length of the tread surface of the foot step is accomplished.

What is claimed is:

1. A vehicle lamp in which a light source is disposed at each end of a bar-shaped light conductor obtained by forming a transparent base material into a bar shape, and the bar-shaped light conductor emits light which is from the light source and enters the bar-shaped light conductor, wherein a light emitting diode is disposed as the light source in a closed container-like casing having at least a portion which further includes a transparent portion and a translucent portion where the light-emitting diode faces the translucent portion, and an end face of the bar-shaped light conductor faces the translucent portion positioned between the end face and the light-emitting diode.

2. The vehicle lamp according to claim 1, wherein:

the casing is comprised of two halves joined together, at least one of which being formed from a transparent material, and the translucent portion is formed in one of the transparent halves that is formed from the transparent material and has a lens function.

3. The vehicle lamp according to claim 2, wherein one of the transparent halves that is formed from the transparent material is covered with a non-transparent cover except for the translucent portion.

4. The vehicle lamp according to claim 3, wherein:

the casing has a tubular coupling portion that protrudes from an area surrounding the translucent portion, and the bar-shaped light conductor is fitted at an end thereof in the coupling portion, and a tubular bushing is disposed between an outer peripheral surface of the end of the bar-shaped light conductor and an inner peripheral surface of the coupling portion.

5. The vehicle lamp according to claim 4, wherein the vehicle lamp is to be installed so as to illuminate a tread surface of a foot step that is stepped on when a passenger gets in and out of a vehicle.

6. The vehicle lamp according to claim 3, wherein the vehicle lamp is to be installed so as to illuminate a tread surface of a foot step that is stepped on when a passenger gets in and out of a vehicle.

7. The vehicle lamp according to claim 2, wherein:

the casing has a tubular coupling portion that protrudes from an area surrounding the translucent portion, and the bar-shaped light conductor is fitted at an end thereof in the coupling portion, and a tubular bushing is disposed between an outer peripheral surface of the end of the bar-shaped light conductor and an inner peripheral surface of the coupling portion.

8. The vehicle lamp according to claim 7, wherein the vehicle lamp is to be installed so as to illuminate a tread surface of a foot step that is stepped on when a passenger gets in and out of a vehicle.

9. The vehicle lamp according to claim 2, wherein the vehicle lamp is to be installed so as to illuminate a tread surface of a foot step that is stepped on when a passenger gets in and out of a vehicle.

10. The vehicle lamp according to claim 1, wherein:

the casing has a tubular coupling portion that protrudes from an area surrounding the translucent portion, and the bar-shaped light conductor is fitted at an end thereof in the coupling portion, and a tubular bushing is disposed between an outer peripheral surface of the end of the bar-shaped light conductor and an inner peripheral surface of the coupling portion.

11. The vehicle lamp according to claim 10, wherein the vehicle lamp is to be installed so as to illuminate a tread surface of a foot step that is stepped on when a passenger gets in and out of a vehicle.

12. The vehicle lamp according to claim 1, wherein the vehicle lamp is to be installed so as to illuminate a tread surface of a foot step that is stepped on when a passenger gets in and out of a vehicle.

* * * * *